United States Patent
Mazet

(10) Patent No.: US 6,672,147 B1
(45) Date of Patent: Jan. 6, 2004

(54) METHOD FOR DETECTING CLOGGING IN A FUEL FILTER IN AN INTERNAL COMBUSTION ENGINE SUPPLY CIRCUIT

(75) Inventor: Henri Mazet, Chatou (FR)

(73) Assignee: Magneti Marelli France, Nanterre (FR)

( * ) Notice: Subject to any disclaimer, the term of this patent is extended or adjusted under 35 U.S.C. 154(b) by 0 days.

(21) Appl. No.: 09/857,918

(22) PCT Filed: Dec. 10, 1999

(86) PCT No.: PCT/FR99/03098
§ 371 (c)(1),
(2), (4) Date: Jun. 11, 2001

(87) PCT Pub. No.: WO00/36291
PCT Pub. Date: Jun. 22, 2000

(30) Foreign Application Priority Data

Dec. 14, 1998 (FR) .................................... 98 15755

(51) Int. Cl.$^7$ ............................................. G01M 15/00
(52) U.S. Cl. ................... 73/119 R; 123/198 D; 123/514; 73/116; 73/119 A
(58) Field of Search ................... 73/116, 117.2, 73/117.3, 118.1, 119 A, 119 R; 123/198 D, 510, 514

(56) References Cited

U.S. PATENT DOCUMENTS

| 4,918,426 A | * | 4/1990 | Butts et al. ................ 340/611 |
| 5,078,167 A | * | 1/1992 | Brandt et al. ............... 137/549 |
| 5,398,655 A | | 3/1995 | Tuckey |
| 5,477,731 A | * | 12/1995 | Mouton ......................... 73/38 |
| 5,505,180 A | | 4/1996 | Otterman |
| 5,595,138 A | | 1/1997 | Claret |
| 5,699,772 A | | 12/1997 | Yonekawa |
| 6,289,726 B1 | * | 9/2001 | Ferris et al. ............... 73/118.1 |

FOREIGN PATENT DOCUMENTS

| DE | 41 17 422 | 12/1992 |
| DE | 196 22 176 | 7/1997 |
| EP | 0 577 477 | 6/1993 |
| FR | 2 686 947 | 1/1993 |
| FR | 2 725 244 | 10/1994 |

* cited by examiner

Primary Examiner—Eric S. McCall
(74) Attorney, Agent, or Firm—Sturm & Fix LLP

(57) ABSTRACT

The invention concerns a method for detecting clogging in a fuel filter, between a fuel pressure regulator imposing a pressure towards the internal combustion engine downstream of the filter and an electric motor pump compressing fuel coming from the tank towards the regulator through the filter which consists in: determining the fuel pressure at the pump output and by considering it as the fuel pressure at the filter intake; determining the fuel pressure at the filter outlet as being the pressure imposed by the regulator; determining the pressure drop of the filter from the difference between the filter input and output pressure levels, and by comparing at least a value based on the pressure drop with at least a reference value to deduce therefrom information concerning the clogging condition of the filter. The invention is applicable to preventive or predictive maintenance of fuel supply circuits in internal combustion engines.

10 Claims, 1 Drawing Sheet

METHOD FOR DETECTING CLOGGING IN A FUEL FILTER IN AN INTERNAL COMBUSTION ENGINE SUPPLY CIRCUIT

CROSS REFERENCE TO RELATED APPLICATIONS

This application is a U.S. National Phase application of PCT/FR99/03098 filed Dec. 10, 1999, claiming priority of French Applicaton No. FR 98/15755 filed Dec. 14, 1998 and is hereby incorporated herein by reference.

BACKGROUND OF THE INVENTION

1. Field of the Invention

The invention relates to a method and a device for detecting clogging in a fuel filter of a supply circuit of an internal combustion engine.

2. Description of the Related Art

The invention relates more specifically to the supply circuits of direct or indirect fuel injection engines, the supply circuits being of the type in which a fuel filter is arranged between a fuel pressure regulator, downstream of the filter and delivering fuel at an imposed pressure towards the engine, and a pump delivering fuel from a tank, this pump being disposed upstream of the filter and supplying the regulator via the filter, this pump generally being an electric pump, i.e. a pump driven by an electric motor.

Conventionally, these supply circuits, used with marine engines or motor vehicles and of the controlled ignition or compression ignition (diesel) type, are such that the pressure regulator, downstream of a supply rail of injectors, maintains a supply pressure of the injectors in this rail which is a substantially constant differential pressure between the fuel pressure and atmospheric pressure or the pressure at the air intake manifold to the engine, regardless of the fuel requirement of the engine, i.e. irrespective of the rate at which fuel is injected into the engine by the injectors, depending on the operating conditions of the engine, excess fuel being returned to the tank by the pressure regulator, as disclosed in particular by EP 0 577 477 and FIG. 1 of FR 2 725 244.

On diesel or controlled ignition high-pressure injection systems, the pump and regulator between which the filter is disposed are low-pressure components which do not supply the injector rail directly but supply a second, high-pressure pump and a second, high-pressure regulator which in turn supply the rail.

In other fuel circuits, the pressure regulator is upstream of the injector supply rail, between the inlet of this rail and the fuel filter downstream of the pump, and preferably close to the tank or inside it, on a bypass pipe opening into the tank, and the regulator is connected to the supply line between the filter and the rail intake, in which case the pressure regulator also returns excess fuel to the tank, as known from FIG. 2 of FR 2 725 244.

Other fuel supply circuits of the "no return" type are also known, i.e. without a passage for returning to the tank fuel in excess at the level of the pressure regulator, the latter also being omitted in certain circuits of this type where the electric supply of the pump is controlled by a sensor which detects the pressure prevailing in the supply line linking the pump to the injector supply rail so that the pump is electrically powered in order to impose a pressure at the pump output which is equal to the usage pressure required at the injectors.

In other circuits of the "no return" type, however, the fuel pressure regulator is a regulator-reducer supplying the injector supply rail and the power supply to the motor driving the pump is controlled by a pressure gauge disposed inside the tank or close to it and linked by a pressure tap to the supply line downstream or upstream of the filter between the pump and the regulator-reducer, so that the regulator-reducer is supplied with fuel at a pressure higher than the usage pressure required at the output of the regulator-reducer, as disclosed in U.S. Pat. No. 5,398,655 and FIGS. 4 and 5 of FR 2 725 244.

In the "no return" circuits known from the above-mentioned patents, the electric pump is controlled in a closed loop by measuring an operating parameter of the supply circuit, this being the fuel pressure at the pump outlet although it may also be the air delivery rate to the air intake manifold to the engine, which air flow rate is indirectly linked to the rate at which fuel is consumed by the engine, as disclosed in FR 2 686 947.

Furthermore, whether the fuel circuit does or does not have a return system for fuel in excess at the level of the pressure regulator, the circuit may be such that the pump is disposed in a fuel reserve dish, which is in turn arranged inside the fuel tank, and a part of the fuel delivered by the pump is diverted to this dish in the form of at least one fuel jet injected into the dish at a rate needed to prevent the pump from draining.

In all these known fuel supply circuits, in which the filter downstream of the delivery pump is often integrated with this pump in a sub-unit housed inside the fuel tank, it is evident that clogging in the filter may cause it to become blocked, at least partially, and disrupt smooth operation of the injection system of the internal combustion engine, or even interrupt its fuel supply. Because the filter is disposed inside the fuel tank and because the filter is not so readily accessible should it have to be replaced, it seemed desirable, not to say necessary, to provide some form of preventive or predictive maintenance for the filter in particular and to this end devise a method and a device for detecting clogging in this fuel filter.

BRIEF SUMMARY OF THE INVENTION

To this end, the method proposed by the invention for detecting clogging in a fuel filter in a fuel supply circuit of an internal combustion engine, in which the filter is disposed on the one hand between a fuel pressure regulator downstream of the filter and of the type operating on a bypass system, delivering fuel at an imposed pressure upstream and towards the internal combustion engine, and, on the other hand, a pump for delivering fuel from a tank, the pump being disposed upstream of this filter and supplying the regulator across the filter, is characterised in that it comprises at least the following steps, which consist in:

- determining the fuel pressure at the pump output and assimilating it with the fuel pressure at the intake of the filter,
- determining the fuel pressure at the filter outlet as being the pressure imposed by the pressure regulator,
- determining the drop in pressure of the filter on the basis of the difference between the intake and outlet pressures of the filter,
- comparing at least one value based on said pressure drop with at least one reference value and deriving information therefrom relating to the clogging condition of the filter, preferably by determining that the filter is clogged if said value based on the pressure drop is higher than at least said reference value.

In order to determine the fuel pressure at the pump output or at the filter intake, this method may consist in measuring the fuel pressure by means of at least one pressure sensor between the pump output and the filter intake.

However, this involves using a pressure sensor which is an expensive component and in one particularly economical embodiment of the method proposed by the invention this method consists in determining the fuel pressure at the pump output on the basis of at least one relationship between said pump output pressure and at least one of the operating parameters of the pump, which are the instantaneous rotation speed of the pump, the mean supply current of an electric motor driving the pump and the thermal state of the pump.

In other words, the fuel pressure at the pump output may be determined by at least one operating model of the pump, taking account of at least the aforementioned operating parameters of the pump, and in particular the mean supply current of the electric motor driving the pump, since, in a known manner, this mean current enables the drive torque of the pump to be determined and this torque can in turn be used to determine the pump output pressure, in particular on the basis of characteristic curves.

In a simple manner, the method may include a step which consists in determining the mean supply current of the electric motor driving the pump by measuring a drop in voltage at the terminals of a shunt in the electric supply circuit of said motor.

However, a better quality operating model of the pump for the purpose of determining the pump output pressure in an open loop may be obtained if the instantaneous rotation speed of the pump and its thermal state are also taken into account.

Advantageously, to this end, the method may additionally consist in driving the pump by means of an electric motor with a commutating collector and determining the instantaneous rotation speed of the pump on the basis of at least the instantaneous rotation speed of the electric motor, which is determined by analysing the instantaneous current in the pump motor and detecting commutations of the collector of said pump motor.

In order to determine the thermal state of the pump, the method may additionally consist in simply measuring the temperature of the pump and/or estimating this temperature on the basis of at least one relationship between this temperature and at least one operating parameter of said pump, i.e. on the basis of a thermal model of the pump.

The step of comparing at least one value based on the pressure drop of the filter with at least one reference value may comprise at least one comparison of at least one absolute value of this filter pressure drop for at least one work rate or at least a given work rate range of the circuit with at least one threshold value for at least the same rate or at least the same fuel rate range and/or at least one comparison of at least one slope value of a variation of the filter pressure drop over time with at least one slope threshold for at least one work rate or at least a given work rate range of the circuit. Clearly, the threshold(s) for the absolute value and/or slope value of the variation of filter pressure drop over time is or are established and specifically indexed as a function of the rate in order to give sufficient advance warning before the filter is at risk of becoming substantially clogged, taking account of absolute or relative values measured or determined under the same rate conditions for other identical circuit filters and correlated with the state of clogging found in these filters on dismantling.

However, in order to improve the quality of preventive or predictive maintenance, it is of advantage to track changes over time in the pressure drop of a same filter and, to this end, the comparison step described above advantageously incorporates at least one comparison of at least one absolute value and/or slope value of the variation of filter pressure drop at a given instant with at least a similar value taken at at least one previous instant for at least one rate or at least a given work rate range of the circuit, and in particular at instants prior respectively to prior re-startings of the engine, the similar corresponding values being saved in memory when the engine is at a standstill.

Accordingly, the comparison steps in fact consist in comparing tables of measured and/or computed pressure drop values, specifically indexed on the basis of rate, with tables of reference values also specifically indexed on the basis of fuel rate.

In implementing the method outlined above, in order to detect clogging in a fuel filter disposed between the output of a pump driven by an electric motor and delivering fuel from a tank, and the intake of a fuel pressure regulator supplied by the pump via the filter and of the type operating on a bypass system which imposes a fuel pressure upstream and towards the engine, the invention also proposes a detection device which is characterised in that it comprises at least one electronic control unit, controlling operation of the pump and its electric drive motor, and which, on the one hand, knows the fuel pressure imposed by the regulator depending on the fuel requirements of the engine, and, on the other, determines the fuel pressure at the pump output on the basis of at least one operating parameter of the pump and/or the electric supply and/or operation of its electric drive motor, such as the instantaneous rotation speed of the pump, the mean supply current of the electric drive motor and the thermal state of the pump, said electronic control unit computing the pressure drop in the filter as being the difference between the fuel pressure levels at the pump outlet and imposed by the regulator, and comparing at least one value based on said pressure drop and/or at least one variation in said pressure drop with at least one reference value in order to deduce information about the state of clogging in the filter.

BRIEF DESCRIPTION OF THE SEVERAL VIEWS OF THE DRAWINGS

Other advantages and features of the invention will become clear from the example of an embodiment given below, which is not restrictive in any respect, described with reference to the appended drawings, of which.

DETAILED DESCRIPTION OF THE PREFERRED EMBODIMENT

Figure 1:
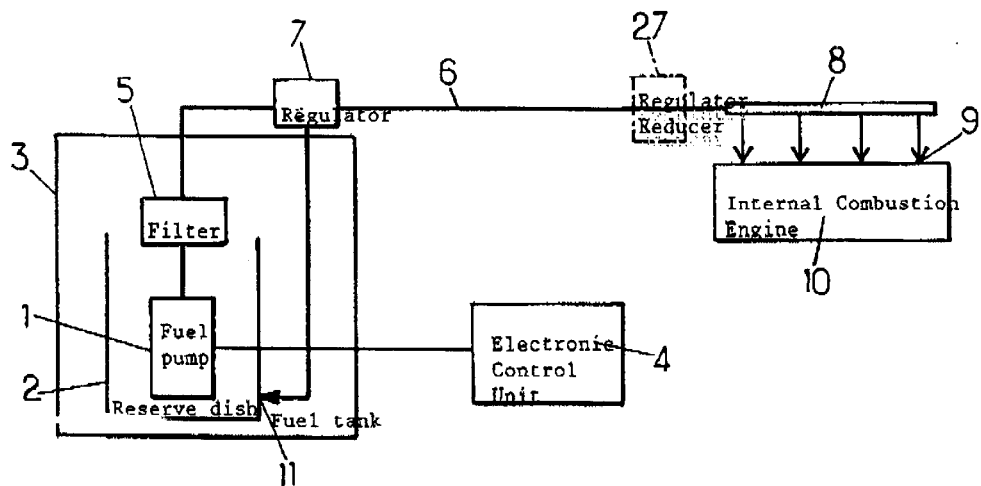
FIG. 1 is a schematic view of the fuel supply circuit of an injection engine and FIG. 2 is a block diagram showing a part of the electronic control unit of the circuit illustrated in FIG. 1, used to compute the pressure drop in the filter of this circuit.

The fuel supply circuit illustrated in FIG. 1 has a fuel pump 1, which is an electric pump of any appropriate known structure, with a pumping stage driven in rotation by an electric motor. In this example, the motor is of the type supplied with an electric current by a commutating collector of the motor, where the electric supply circuit of the motor for the pump 1, drawn from the battery of a motor vehicle for example, has, in a known manner, a shunt for measuring the mean supply current of this electric motor, by means of which a difference in potential at the terminals of this shunt is measured.

The electric pump 1 is disposed in a fuel reserve dish 2, this dish 2 being in turn disposed on the base of a fuel tank 3.

The electric motor of the pump 1 is powered with electric current from the battery of the vehicle, via an electronic control unit 4, which controls operation of the pump 1 and its electric motor and which measures the difference in voltage at the terminals of said shunt in the electric supply circuit of this motor as well as the instantaneous rotation speed of this motor, and hence the instantaneous rotation speed of the pump 1, by analysing the instantaneous current of the motor of the pump 1 and detecting commutations of the collector of this motor. In a manner know per se and commonly practised in laboratories, commutations of the collector of this motor can be detected by filtering the instantaneous current of this electric motor in at least a high-pass filter.

The pump 1 draws in fuel from the reserve dish 2, preferably via an upstream filter (not illustrated) and delivers the fuel through a downstream filter 5 into a supply line 6 to a fuel pressure regulator 7.

This regulator 7 on the one hand supplies fuel to a rail 8 at the downstream end of the supply line 6, which is a common rail for the injectors 9 of the internal combustion engine 10 mounted on the vehicle. To this end, the regulator 7 is of the type which operates on a "bypass" system, i.e. as if it were mounted as a bypass on the supply line 6 controlling a fuel "leak" to the engine 10. Consequently, the regulator 7 imposes a fuel pressure upstream and to the rail 8 of the engine 10 downstream. On the other hand, the regulator 7 diverts a fraction of the fuel delivered by the pump 1 into the supply line 6 to the reserve dish 2 and this diverted fuel fraction is returned to the dish 2 in the form of a jet 11 injected into the base of the dish 2 at a minimum rate needed to prevent the pump 1 from draining, depending on the level of the tank 3 and other parameters such as the movements of the vehicle and temperature of the fuel.

If the engine 10 operates on indirect injection with controlled ignition, the regulator 7 supplies the rail 8 directly with fuel at a pressure which satisfactorily services injectors 9 at a substantially constant differential pressure between the fuel pressure and the air pressure at the air intake manifold of the engine.

If the engine 10 operates on direct injection with controlled ignition or compression ignition, the regulator 7 supplies the rail 8 indirectly via a high-pressure pump connected to a high-pressure regulator (not illustrated), which determines the pressure at which the fuel is injected by the injectors 9.

In either case, the regulator 7 is of a known type, the pressure characteristic of which as a function of rate is known for that construction and such that the regulator 7 requires a minimum fuel supply rate to operate smoothly, i.e. so that it can deliver fuel to the rail 8 downstream at a satisfactory pressure, irrespective of the fuel requirements of the engine 10.

In another embodiment, the fuel fraction delivered by the pump 1 and used to supply the jet 11 into the reserve dish 2 is diverted from the supply line 6 upstream of the regulator 7, between the latter and the filter 5.

The filter 5, the regulator 7 and the fuel diversion to the jet 11 may be arranged in a sub-unit close to the tank 3 or inside it, where this sub-unit may be directly connected to the pump 1.

The control unit 4 may be a unit which monitors operation of the pump 1 by means of the electric supply to the motor of the pump 1 and, on the basis of supply and operating parameters of the pump 1 and its electric motor, in particular the mean supply current of the motor of the pump 1 and its instantaneous rotation speed, measured as explained above, determines the fuel pressure at the output of the pump 1 by computations and by consulting appropriate maps.

However, by preference, the unit 4 controls the pump 1 so that its real rate is as far as possible in line with an objective rate, substantially corresponding to the minimum rate needed to satisfy the requirements of the internal combustion engine 10 from every operating aspect whilst simultaneously meeting the minimum rate for smooth operation of the regulator 7 and generating an efficient supply to the return jet 11 into the reserve dish 2 in order to prevent the pump 1 from draining.

In particular, the control unit 4 may control the electric pump 1 in the manner described in French patent application FR 98 08991 filed by the present applicant.

In either case, whether the control unit 4 merely controls the power supply to the motor of the pump 1 and monitors this pump 1 to ensure that it is operating correctly or whether the control unit 4 controls the pump 1 on the basis of an objective rate, this unit 4 will determine, by estimation and/or computation, the fuel pressure at the output of the pump 1, this pressure being assimilated with the fuel pressure at the intake of the filter 5, and by taking account of a fuel pressure imposed by the regulator 7, which is known by the unit 4 and assimilated with the pressure downstream of the filter 5, the unit 4 computes the pressure drop in the filter 5 as being equal to the difference between the fuel pressure at the output of the pump 1 and the fuel pressure imposed by the regulator 7 downstream of the filter 5, this pressure drop being considered by the unit 4 as representative of the state of clogging in the filter 5.

The way in which at least one value dependent on the pressure drop in the filter 5, representing the degree to which it is clogged, is determined and compared with at least one reference value to output a signal which can be used as a means of preventive or predictive maintenance by issuing a warning in the event of critical clogging in the filter 5 is described below with reference to FIG. 2, which is a block diagram providing a partial and schematic diagram of the structure of the unit 4 and certain functions performed by this unit 4.

Figure 2:
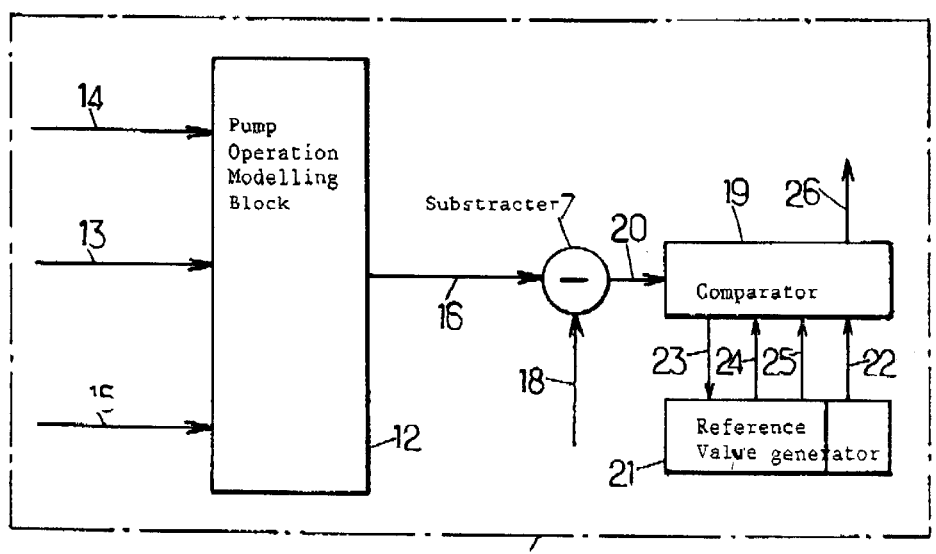

In FIG. 2, the unit 4 has a block 12 for modelling operation of the electric pump 1, this block 12 having computing as well as signal and data processing circuits which run algorithms and programmes enabling operation of the pump 1 to be simulated to determine certain variables, in particular the fuel pressure at the output of the pump 1, depending on operating and feeding parameters, as the power supply to the pump 1 and its electric motor. The modelling block 12 has microprocessors and/or microcontrollers and memories in which maps are stored charting the characteristic values or curves of certain pump parameters dependent on other parameters and in particular maps charting pressure values at the output of the pump 1 as a function of the mean supply current to the electric motor of the pump 1, the instantaneous rotation speed of the latter as well as the temperature of the pumping stage of the pump, it being possible to measure this temperature directly by at least one temperature sensor or determine it in another modelling block incorporated in the unit 4, this other block being a block providing a thermal model for the pump 1.

In particular, the modelling block 12 receives a signal at 13 representative of the mean supply current of the electric motor of the pump 1, this mean current being measured, as explained above, by measuring a drop in voltage at the terminals of a shunt in the electric supply circuit of the motor. This mean current signal 13 is the main operating parameter taken into account by the modelling block 12 to determine the output pressure of the pump 1 because it is known that this output pressure is dependent on the drive torque of the pump 1, this torque in turn being dependent on the mean supply current to the electric motor driving the pump 1. However, the output pressure of the pump 1 can be determined more accurately by additionally taking account of a signal 14 representing the instantaneous rotation speed of the pump motor, which is received by the block 12 and derived, as also explained above, by analysing the supply current to the motor of the pump 1 and detecting commutations of its collector. Another operating parameter of the pump 1 taken into account as a means of accurately determining the output pressure of the pump 1 is the temperature of the pump and a signal 15 representative of this temperature is received by the block 12, from either a temperature sensor (not illustrated) or another block (not illustrated) running a thermal model of the pump 1. On the basis of said signals 13, 14 and 15 received by the block 12 and using a relationship between the output pressure of the pump 1 and the parameters corresponding to the signals 13, 14 and 15, the block 12 works out a signal 16 corresponding to an estimation of the output pressure of the pump 1 and this signal 16 is transmitted to a subtracter 17, which also receives a signal 18 representing a pressure imposed by the regulator 7 downstream of the filter 5.

This pressure signal 18 of the regulator 7 is transmitted to the unit 4 by an electronic engine control unit (not illustrated) of any appropriate known type, which controls injection and, as is the case, ignition in the engine 10, or the signal 18 is worked out by the unit 4 on the basis of information from the engine control unit and data stored in the unit 4 relating to characteristic operating values or curves of the regulator 7, in particular its characteristic pressure-rate, known on the basis of its construction.

The electronic engine control unit knows the instants at and durations for which fuel is injected by the injectors 9 into the cylinders of the engine 10 for any operating point of the engine because it controls the injection and also advantageously ignition if the engine 10 is a controlled ignition engine, and optionally other functions such as anti-slip or alternatively air intake in the case of a motorised butterfly valve and hence the pressure imposed by the regulator 7, since the latter, by construction, generally works at a constant differential pressure between the pressure of the fuel it delivers and the pressure of the air intake to the engine 10.

The electronic control unit 4 of the fuel circuit therefore co-operates with the engine control unit, in which it is advantageously at least partially integrated, with the exception, optionally, of its power stage, through which relatively high currents pass for the electric supply to the motor of the pump 1.

By computing the difference between the signal 16 representing the output pressure of the pump 1 and the signal 18 representing the pressure imposed by the regulator 7, i.e. by computing the difference between signals representing the intake and output pressures of the filter 5 respectively, the subtracter 17 applies a signal 20 to the comparator 19 representing the pressure drop in the filter 5.

The comparator 19 runs comparisons between the signal 20 for the instantaneous pressure drop which it receives from the subtracter 17 and, at 23, transmits to a block 21 which generates a reference value, and at least one reference value, which may be an absolute value threshold 22 of the pressure drop stored in a part of the block 21, and/or a reference threshold 24 which is the absolute value of the pressure drop computed at a previous instant and stored in the block 21. Simultaneously, the comparator 19 and/or the block 21 can also compute averages of the pressure drop 20 measured at sliding time intervals or slopes representing the variations in pressure drop and stores these in shift registers of the block 21, and the comparator 19 can also compare an average or a slope of variation in pressure drop 20 with one or more averages or slopes 25 of variation in pressure drop which were stored in the block 21 at previous instants.

In particular, an initial reference value for the pressure drop may be determined for each type of circuit, designed for a particular vehicle model for example, by averaging the initial measurements on a certain number of such circuits in good condition. Then, when the engine of a vehicle powered by a circuit of this type is used for the first time, the initial pressure drop of the filter of this circuit is measured and compared with the initial reference value and the measured value will not be validated and stored as being the "personalised" initial reference value or value specific to this circuit unless the difference between the measured value and the initial reference value is within a predetermined range of tolerance, which is regarded as admissible relative to the initial reference value from the outset, to take account of manufacturing and assembly tolerances for the various components of the supply circuit.

Clogging of the filter over time is tracked by monitoring changes over time in the variation of the pressure drop by comparing the instantaneous pressure drop with the personalised initial reference value and pressure drop values measured and stored during different operating periods of the engine and saved in the memories of the unit 4 during periods when the engine 10 is at a halt.

Since the pressure drop of a filter depends in particular on the rate of the fuel passing through it, the absolute and/or relative values (slopes of variations) of the pressure drop which are compared and/or stored are considered, taking account of at least the values for the work rate of the circuit at corresponding measuring instants. As a result, the reference values with which the measured or computed values are compared are values drawn from indexed reference tables, based in particular on work rate. The instantaneous work rate of the circuit may be known by the electronic control unit 4 through an instantaneous rate signal issued by the pump modelling block. Similarly, the individualised reference value mentioned above is in fact a table of individualised reference values dependent on rate.

For these reasons, changes in the state of clogging in the filter 5 can be measured in real time by comparing tables of values stored for the pressure drop in the filter and indexed as a function of rate with tables of reference values specifically indexed as a function of rate.

This will enable changes in clogging in the filter 5 to be monitored in real time by reference to one or more absolute or relative values, statistically determined by tests or measurements taken during operation on identical supply circuits or by reference to absolute or relative pressure drop values measured for this same filter 5 at previous instants during previous periods of engine operation, the values being stored in memories of the computer when the engine is at a halt.

The comparator 19 is therefore able to issue an output signal 26 representative of the state of clogging of the filter 5. In particular, the output signal 26 may be a warning signal if a value based on the absolute pressure drop 20 measured instantaneously is higher than a reference threshold 22 corresponding to a critical state of clogging in the filter 5.

In another embodiment and as illustrated by broken lines in FIG. 1, the fuel supply circuit may additionally incorporate a regulator-reducer 27, immediately upstream of the rail 8, between the latter and the pressure regulator 7 towards the tank 3 or inside the latter. This regulator-reducer 27 may be a diaphragm regulator with an intake valve of the type known from U.S. Pat. No. 5,398,655 and FR 2 725 244, for example. The regulator-reducer 27 defines the fuel pressure in the rail 8 on the basis of a higher fuel pressure which it receives from the regulator 7, which may be a low-cost regulator which regulates the pressure less accurately than in the configuration of circuits without a regulator-reducer 27.

What is claimed is:

1. A method of detecting clogging in a fuel filter having a filter intake and a filter outlet and provided in a fuel supply circuit of an internal combustion engine, and disposed between a fuel pressure regulator downstream of said filter and operating on a bypass system delivering fuel at an imposed pressure upstream and towards said internal combustion engine and a pump for delivering fuel from a tank, said pump being disposed upstream of said filter and supplying said regulator via said filter of which said filter intake is connected to a pump output and said filter outlet is connected to a regulator inlet, wherein said method comprises at least the following steps, determining a first fuel pressure at said pump output and assimilating said first fuel pressure with a fuel pressure at said filter intake, determining a fuel pressure at said filter outlet as being a second fuel pressure imposed by said pressure regulator, determining a pressure drop of said filter on the basis of the difference between said first and second fuel pressures, comparing at least one value based on said pressure drop with at least one reference value and deriving information therefrom relating to the clogging condition of said filter (5).

2. Method as claimed in claim 1, consisting of determining said first fuel pressure at said pump output by measuring said first fuel pressure by means of at least one pressure sensor between said pump output and said filter intake.

3. A method as claimed in claim 1, consisting of determining said first fuel pressure at said pump output on the basis of at least one relationship between said first fuel pressure and at least one of operating parameters of said pump, which are the instantaneous rotation speed of said pump, the mean supply current of an electric motor driving said pump and the thermal state of said pump.

4. A method as claimed in claim 3, consisting of driving said pump by use of an electric motor with a commutating collector and determining said pump instantaneous rotation speed on the basis of at least the instantaneous rotation speed of said electric motor, which is determined by analysing the instantaneous current in said electric motor and detecting commutations of said motor collector.

5. A method as claimed in claim 3, consisting of determining said mean supply current of said electric motor by measuring a drop in voltage at terminals of a shunt in an electric supply circuit of said motor.

6. A method as claimed in claim 3, consisting of determining said pump thermal state by measuring or estimating the temperature of said pump on the basis of at least one relationship between said pump temperature and at least one operating parameter of said pump.

7. A method as claimed in claim 1, wherein the step of comparing at least one value based on said pressure drop with at least one reference value incorporates at least one comparison of at least one absolute value of said filter pressure drop for at least one work rate or at least a given work rate range of said circuit with at least one threshold value for at least said rate or at least said range of fuel rate.

8. A method as claimed in claim 1, wherein the step of comparing at least one value based on said pressure drop with at least one reference value incorporates at least a comparison of at least one slope value for a pressure drop variation in said filter over time with at least a slope threshold for at least one work rate or at least a given work rate range of said circuit.

9. A method as claimed in claim 1, wherein the step of comparing at least one value based on said filter pressure drop with at least one reference value incorporates at least one comparison of at least one absolute value or slope value of a pressure drop variation in said filter at a given instant with at least a similar value at least a previous instant for at least one work rate or at least a given work rate range of said circuit.

10. A device for detecting clogging in a fuel filter of a fuel supply circuit of an internal combustion engine, said filter being disposed between an output of a pump driven by an electric motor and delivering fuel from a tank, and an inlet of a fuel pressure regulator supplied by said pump via said filter and imposing a fuel pressure towards said engine and towards said filter, said device comprising at least one electronic control unit, controlling operation of said pump and said electric drive motor, and which, on the one hand, knows said fuel pressure imposed by said regulator depending on fuel requirements of said engine, and, on the other hand, determines a fuel pressure at said pump output on the basis of at least one of operating parameters of said pump including the instantaneous rotation speed of said pump, the mean supply current of said electric drive motor and the thermal state of said pump, said electronic control unit computing a pressure drop in said filter as being the difference between a fuel pressure at said pump output and said imposed fuel pressure as imposed by said regulator, and comparing at least one value based on said pressure drop or at least one variation in said pressure drop with at least one reference value in order to deduce information therefrom about the state of clogging in said filter.

* * * * *